S. A. BHISEY.
TYPE CASTING MACHINE.
APPLICATION FILED AUG. 11, 1914.

1,240,168.

Patented Sept. 18, 1917.
7 SHEETS—SHEET 1.

S. A. BHISEY.
TYPE CASTING MACHINE.
APPLICATION FILED AUG. 11, 1914.

1,240,168.

Patented Sept. 18, 1917.
7 SHEETS—SHEET 3.

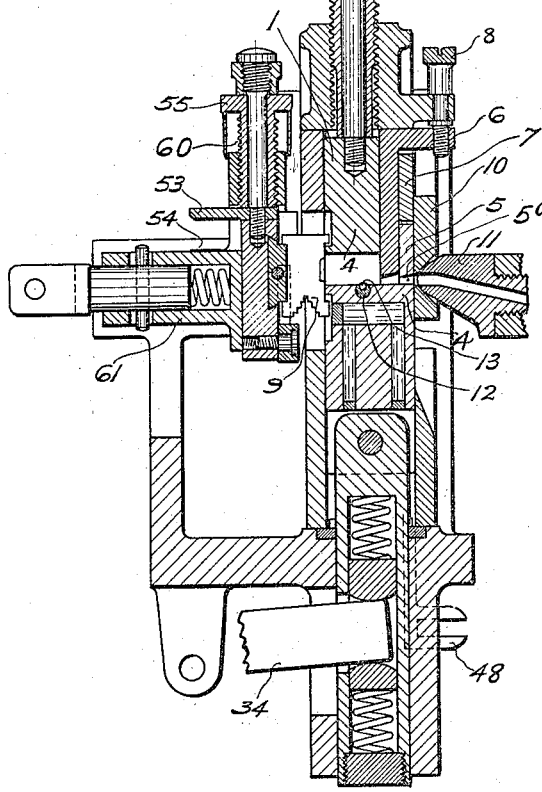

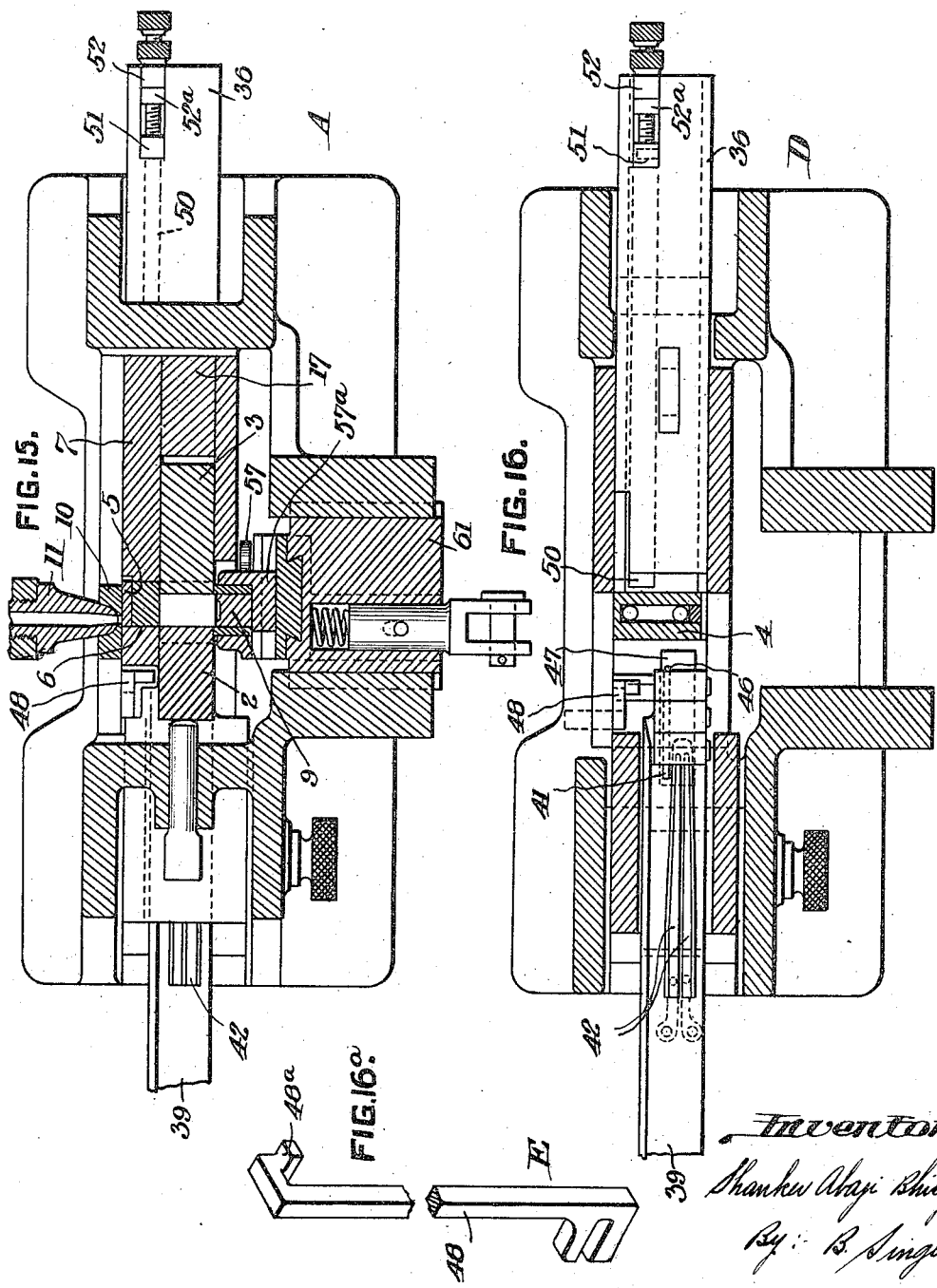

S. A. BHISEY.
TYPE CASTING MACHINE.
APPLICATION FILED AUG. 11, 1914.
1,240,168.
Patented Sept. 18, 1917.
7 SHEETS—SHEET 6.
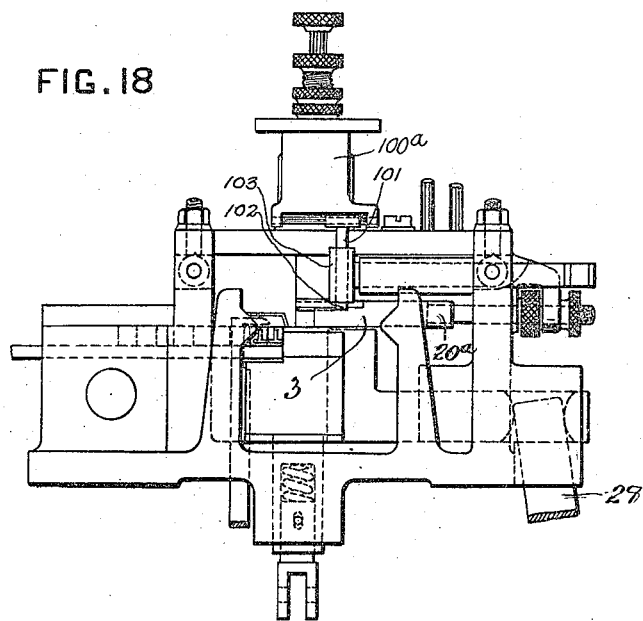
FIG. 18
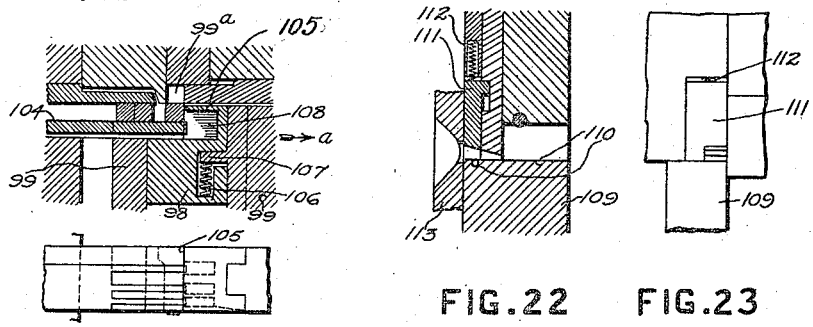
FIG. 19
FIG. 20
FIG. 22    FIG. 23

S. A. BHISEY.
TYPE CASTING MACHINE.
APPLICATION FILED AUG. 11, 1914.
1,240,168. Patented Sept. 18, 1917.
7 SHEETS—SHEET 7.
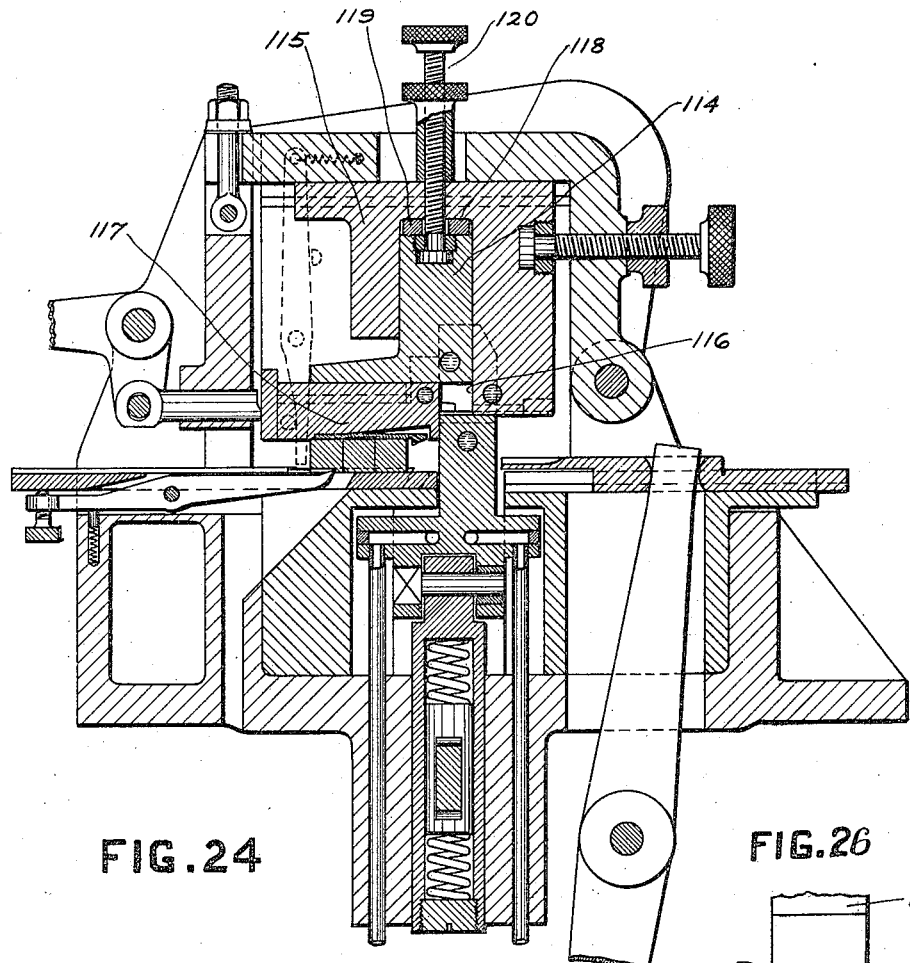
FIG. 24
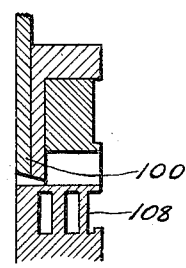
FIG. 21
FIG. 26
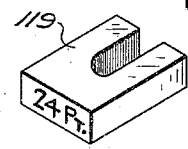
FIG. 25

UNITED STATES PATENT OFFICE.

SHANKER ABAJI BHISEY, OF LONDON, ENGLAND, ASSIGNOR TO SIR RATAN TATA, OF LONDON, ENGLAND.

TYPE-CASTING MACHINE.

1,240,168. Specification of Letters Patent. Patented Sept. 18, 1917.

Application filed August 11, 1914. Serial No. 856,300.

*To all whom it may concern:*

Be it known that I, SHANKER ABAJI BHISEY, a subject of the King of Great Britain, residing at London, England, have invented certain new and useful Improvements in Type-Casting Machines, of which the following is a specification.

This invention relates to improvements in type casting machines, and has reference to machines for casting single types. Machines of this kind at present in general use comprise two kinds. According to one known construction the type casting mold is made up of a set of two L shaped parts mounted on a swinging frame by the action of which they are made to open and close. Such an arrangement is very costly and a fresh set of mold parts is required for each size of type body, and as the mold has to move a good distance away from the metal pot, the speed of the machine is very limited. Machines of the other known kind work more rapidly but have the great defect of producing burs on the cast type and thereby affect its accuracy owing to the type body forming pieces and other mold parts constantly sliding between two fixed parts of the mold. In my present invention I have entirely overcome the above defects by constructing the principal part of the mold to consist of a body piece, an adjusting piece and a wall piece which practically form a mold and when the parts are once adjusted to the required body and set width of the type retain the form and have no internal sliding parts. The mold is closed according to my invention by a movable platform or a cover plate upon which the types are cast and preferably remain till they are pushed on to the receiving platform. It will be observed that the construction and operation of my mold differs radically from those previously proposed and I believe I am the first person to provide a machine having such a mold consisting of non-rubbing parts and provided with a very simple body forming or adjusting piece. Among other important features of my invention may be mentioned means whereby the cast types are held down upon the platform or cover plate after casting, means whereby they are transferred from the platform or cover plate to a receiving platform or channel. The preferred means for holding the types down upon the cover plate comprises a nick or projection forming member upon the platform or cover plate coöperating with an extruding device or devices associated with the platform or cover plate. Further features of the invention consist of improved means for cutting nicks in the types after they have been cast and while they are being packed and preventing wear upon all relatively sliding parts.

In the accompanying drawings I have illustrated my invention, Figure 1 being a front elevational view of the machine with part of the pedestal removed.

Figure 3:
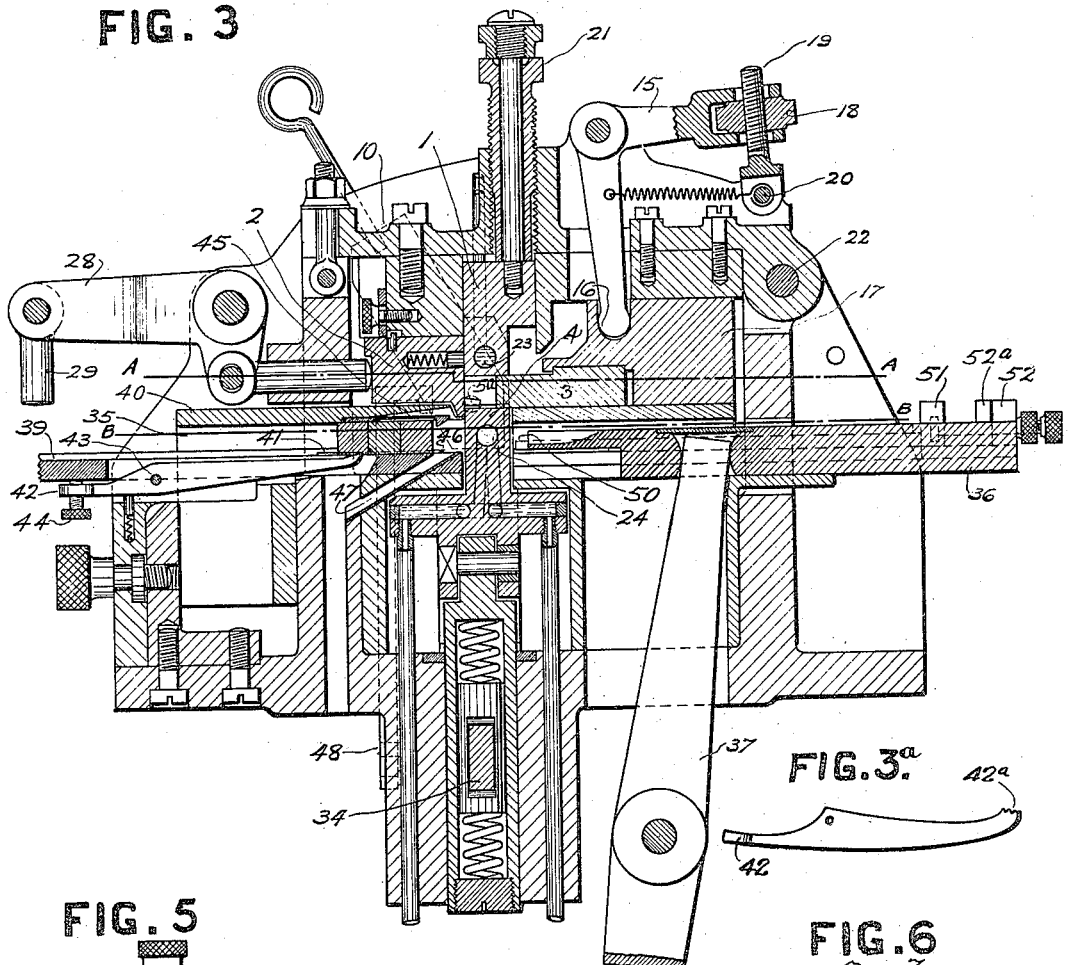
Fig. 3 is a section taken substantially on line *a—a* of Fig. 2 and is drawn to an enlarged scale.

Fig. 3ᵃ is a detail view of an element for removing dits from the cast type.

Figure 1:
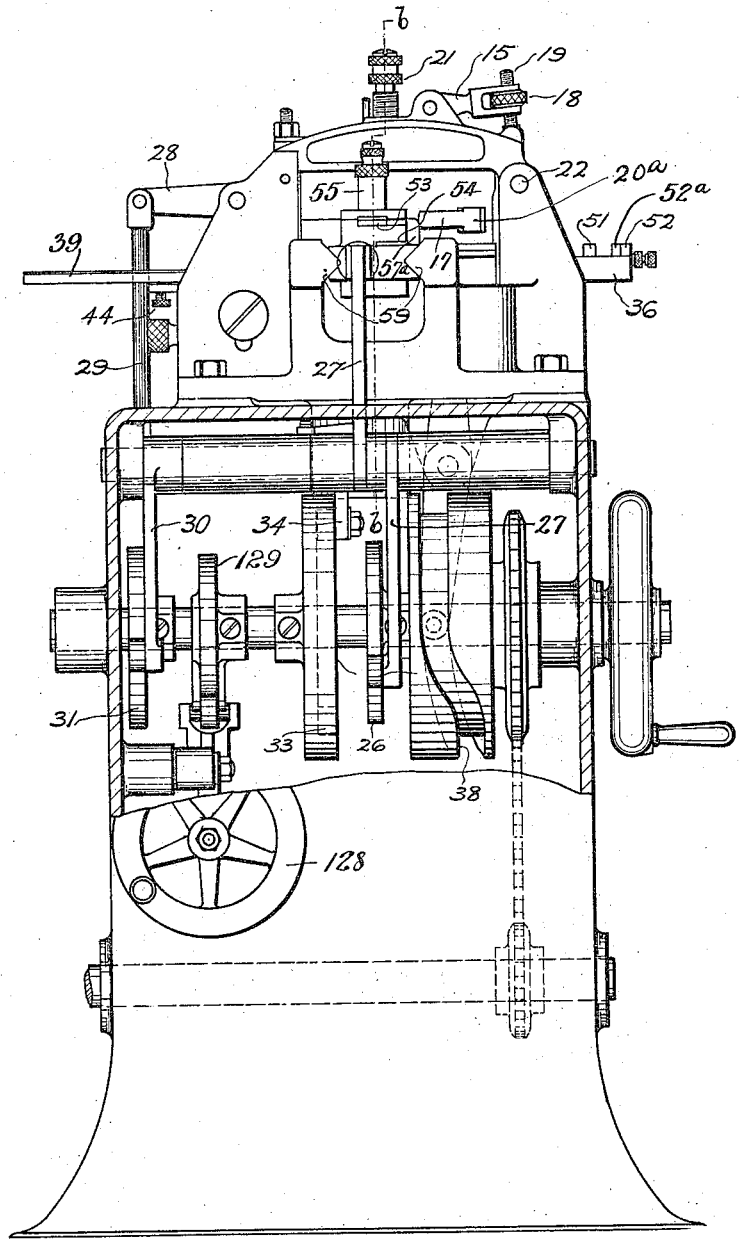

Fig. 4 is a section taken substantially on line *b—b* of Fig. 1.

Figure 5:
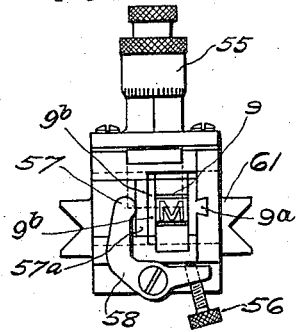

Fig. 5 is a more detailed view of the matrix holding and adjusting mechanism.

Figure 6:
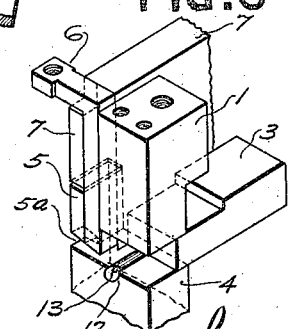

Fig. 6 is an isometric view showing in greater detail the mold forming members.

Figures 7, 8:

Fig. 7 is an isometric view of a type and tang piece as cast, in this particular example the set width being smaller than the width of the tang.

Fig. 8 is a similar view of a type having a larger set width.

Figs. 9, 10 and 11 are views showing a modification in the mold forming members of the machine, Fig. 9 being a front sectional view, Fig. 10 a sectional view on line *c—c* of Fig. 9, Fig. 11 a sectional view on line *d* of Fig. 9.

Fig. 12 is a sectional view similar to Fig. 4 but illustrating how cored quads and space type may be cast.

Fig. 13 is a part plan of Fig. 12.

Fig. 14 is a sectional view similar to Fig. 4 but showing an alternative method of withdrawing the type.

Fig. 15 is a horizontal sectional view on the line A—A of Fig. 3.

Fig. 16 is a sectional view taken on the line B—B of Fig. 3.

Fig. 16ᵃ is a detail in perspective, showing the tang separating member.

Fig. 17 is an isometric view showing an alternative method of arranging the "tang" or break forming member, and having special reference to the machine shown by Figs. 1-8.

Figs. 18, 19, 20 and 21 are views showing an alternative arrangement of the mold parts, Fig. 18 being a front elevational view, Fig. 19 a front sectional view through the mold cavity, Fig. 20 a plan view of Fig. 19 with the upper parts removed for convenience of illustration.

Fig. 21 is a section through the mold cavity.

Figs. 22 and 23 illustrate in section and front elevation a modification of a detail of the machine.

Fig. 24 illustrates in sectional elevation a modificaton of the mold parts, and

Fig. 25 is a perspective view of the body piece used in this modification.

Fig. 26 is a view of certain parts shown in Figs. 6 and 17, looking in the direction of the arrow in Fig. 17.

Referring to these drawings and particularly to Figs. 1 to 8 a mold is formed (see Figs. 3 and 4) by means of an adjustable block 1, a side wall 2 and a body piece 3 and the mold is closed by a cover plate or platform 4 upon which the types are cast. Attached to the platform 4 a slotted plate or hook shaped member 5 is provided and the slot 5ª in this plate is closed on one side by the side wall 2 of the mold, and thus forms a part of the tang or break mold, the other part of this tang mold being formed by the adjustable tang plate 6 which is closed upon one side by the mold member 2 and upon the other side by a plate 7. The tang plate 6 is adjusted by means of the screw 8 so that the size of the orifice between the tang mold and the type mold proper can be varied and adjusted. The end of the type mold is closed by a matrix 9 and at the front of the mold a nozzle plate 10 is provided through an orifice in which metal, ejected from the metal spout 11 in the usual way, passes into the mold cavity as will be readily understood upon reference to Fig. 4 of the drawings. The platform 4 is provided with a nick forming pin 12 which fits into a corresponding recess in the mold body piece 3. The end of this pin is provided with a wedge or other groove 13 so shaped that while a cast type can be moved longitudinally of the nick forming pin it cannot be lifted off the platform 4 by reason of the small "dit" or projection 14 shown in Fig. 7 being engaged in the groove 13.

Set width adjustment of the mold is effected by the bell crank lever 15 which engages at one end in a recess 16 in a slidable member 17 associated with the body piece 3 while its other end can be adjusted by means of the nut 18 which coöperates with the screw 19 pivoted at 20, an abutment 20ª co-operating with an interposed matrix or gage plate 57ª to control the setting of pieces 3 and 17 to give the correct set width of the mold and the type, as will be readily understood upon reference to Fig. 1 of the drawings.

Body size adjustment is effected by changing the body pieces 3 and adjusting the block 1 to it by means of the adjusting screw 21. The top part of the mold is arranged to swing out about the pivot or hinge 22 so as to render this body piece and other internal parts of the mold accessible. The block 1, and the platform 4 upon which the types are cast, are shown provided with water cooling passages 23 and 24 respectively, and it will be appreciated that other parts may be similarly cooled if desirable.

The operation of the machine is as follows:

After a type has been cast the matrix holder illustrated in Fig. 5 moves horizontally away from the mold by means of the link 25 actuated from the cam 26 through the lever 27. The side wall 2 then moves slightly to open the mold so as to prevent rubbing. This slight movement is effected by the bell crank lever 28 which is connected by the connecting rod 29 to the lever 30 actuated by the cam 31 and spring 32. The platform 4 now moves down under the influence of the grooved cam 33 and connecting lever 34. The platform 4 moves downward until the type which is connected to it by the engagement of the dit or projection 14 in the groove of the nick forming pin 12 and also by the engagement of the hook shaped member 5 with its tang or break piece, is opposite to the receiving channel 35. A pusher or packer 36 then operates to push the type into the channel and this pusher is actuated by means of a lever 37 actuated by a grooved cam 38. After the pusher or packer has operated to push the types into the channel or receiver 35, it recedes again, the side wall 2, platform 4 and matrix holder return to their normal positions ready for the next casting operation, and it will be observed that the foregoing operations are effected without any rubbing action of the mold parts taking place. The type channel or receiver 35 is formed by a stationary platform 39 and an adjustable cover 40. The platform 39 is provided with a bead or rib 41 and nick cutters 42 adjustable about pivots 43 by means of the screws 44. The cover 40 has a spring catch 45 at one end and at this end the cover is narrowed somewhat to allow clearance for the end of the pusher or packer 36 when a type of small body size is being dealt with. The spring catch 45 operates to hold the last type packed in position. During the packing operation the dit or nick projection 14 is removed or cleaned from the cast nick by means of the knife end 46 of the bead 41 and the severed dits or projections fall down the channel or passage 47, while further nicks are cut in the type as may be desired by means of the nick cutting devices 42$^a$ on lever 42 past which the types are pushed. The cutting ends of these cutting devices preferably consist of teeth or serrations arranged in tandem, the foremost tooth being slightly lower than the succeeding one and so on, so that each tooth has only a small amount of work to perform. In the drawings two of these devices are shown but any number may of course be provided and by means of the adjusting screws 44 any or all of them can be adjusted out of cutting position or in position to cut nicks to any required depth. During this nick cutting operation the cast types are guided by means of the bead 41 with which the cast nick in the type engages. The tang or break piece of the type is removed by means of the tang separator 48 which is operated as the platform 4 moves back to the casting position by the lever 49 actuated by the lever 34 which actuates the platform 4.

It will be observed that as the set width of the type varies, the edges of the type and of the tang piece which are nearest the packer will alter their relative positions as will be seen upon reference to Figs. 7 and 8 which illustrate types of different set widths. To allow for satisfactory packing of these types the pusher or packer 36 is constructed in two parts so that the part 50 of the packer which comes in contact with the tangs or break pieces of the types is adjustable so that the part of the pusher which engages the type body and the part which engages the tang or break piece both make contact simultaneously. The pusher ends are varied and set by varying and setting the distance between the jaws 51 and 52 according to the set width of the particular type being dealt with, and this setting may be arrived at by interposing the matrix between the jaws 51 and 52 where only one kind of matrix is used, but various kinds of matrix can be provided for by providing fitting or gage members such as 52$^a$, adapted to be interposed between the jaws 51 and 52 together with the matrix employed. When it is desired to change the body size the matrix will have to be lowered or raised according as to whether the new body size is smaller or larger than the preceding one. In order to enable this to be readily effected, the end of the body piece which determines the body size is inserted between jaws 53 and 54, which jaws are then adjusted thereto. To allow for double letter matrices distance pieces may be employed in conjunction with the body pieces. Fine adjustment may be provided for by means of a micrometer head 55.

The matrix carrier is illustrated in Fig. 5. The matrix 9 is mounted in the carrier and the screw 56 screwed up until the end 57 of the bell crank lever 58 jams the clamp plate 57$^a$ and matrix 9 firmly in place. The matrix carrier as a whole slides into position upon guides 59. The matrix can be adjusted in position in the carrier vertically by means of an adjusting screw 60 which operates to cause the whole of the interior part of the carrier to slide relative to the outer frame 61.

In the drawing a matrix of the linotype character is shown with no side margins and when such matrices are used fitting strips 9$^a$ and 9$^b$ are employed. When however electrotype matrices are employed with side margins the fitting pieces 9$^a$ and 9$^b$ are removed. It will be observed the construction of the mold could be modified in several ways without departing from the spirit of the invention.

In Figs. 9, 10 and 11 I have illustrated a modification of the mold forming members. In this case the mold moves bodily from the mold closing platform 61$^a$ which remains stationary with the cast type attached to it by means of the undercut nick forming pins indicated by the numeral 62. The mold parts are carried in a plunger device 64 and these mold parts comprise body members 65 and 66 the member 65 being vertically adjustable by means of the screw 67. In operation in this case after a type has been cast, the plunger device 64 rises and leaves the type on the platform 61$^a$ and the pusher 68 then pushes the cast type into the receiving channel 69. The pusher 68 in this case consists of two members 68$^a$ and 68$^b$, the member 68$^b$ engaging the tang or break piece. When the pusher has pushed the type up to the obstruction 70 on the receiving platform, the spring 71 compresses and the obstruction 70 causes the tangs or break pieces to be broken off. Figs. 12 and 13 show a means for casting cored quads or space type. In this case instead of a matrix a core 72 is provided attached by a narrow neck 73 to a core holder 74. In other respects the arrangement and operation is precisely similar to that described in relation to Figs. 1–8, but the matrix holder (Fig. 5) remains stationary. The types are cast and then carried down by the platform 75 to which they are attached by the nick forming pins 76 and the hook device 77 attached to the platform 75 and a pusher then operates to push them into a receiving channel. Fig. 14 shows how the hook device for engaging the tang or break piece of the type can be dispensed with and the types held to the platform 78 by the pieces 79, 80, which are cast with them and which are so shaped as to insure the type being incapable of rising off the platform. The piece 80 is a small "dit" or projection which is removed in the manner previously described and of course the piece 79 being on the tang or break piece is removed together with the tang or break piece.

Fig. 17 shows how instead of always casting the tangs or break pieces the same width irrespective of the set width of the type, the tang or break mold may be adjusted with the adjustment for set width. In this case the body piece 96 of the mold has connected to it another piece 97 which moves with it and thus adjusts the set width of the tang mold simultaneously with the adjustment for the type mold proper, thus obviating the necessity for adjusting the ends of the pusher or packer. In Figs. 18, 19, 20 and 21 the arrangements to cause the type to be carried down with the platform and then delivered to a receiving channel differ somewhat. The types are cast on the platform as before. The platform designated by the numeral 98 is mounted in a block 99 which slides bodily in the direction of the arrow $a$ with the platform after the type has been cast and thus the mold cavity 99$^a$ is open. Instead of the platform moving down with the types on it the types are pushed out by means of a plate 100 (see Fig. 21) which forms part of the tang or break mold and after the casting operation descends. Acting in conjunction with this plate a finger 101 moves from the position shown in Fig. 18 by means of a suitably actuated slider 103 to the position where its end 102 is over the character portion of the type. This finger 101 and the plate 100 descend with the dome 100$^a$ and push the type on to the end of a stationary platform 104. The block 99 then moves back to the casting position carrying the plunger 98 with it and the shoulder 105 pushes the type along the receiving platform 104 and closes the mold for the next operation. In order to prevent rubbing a spring 106 is interposed between the lug 107 of the block 99 and the platform 98 so that immediately the casting pressure is relieved the platform 98 moves slightly away from the mold. For purposes of strength ribs 108 are provided and the end of the stationary receiving platform has portions cut away to accommodate these ribs. In Figs. 22 and 23 I have illustrated a modified device for coöperating with the nick forming pins for carrying down the cast type with the platform. The types are cast on the platform 109 and are held thereto by the drag forming members 110 as before. Instead however of the hook like device previously described as connected to and moving with the platform I provide a plate 111 which here again forms part of the tang or break mold and when the platform 109 descends the spring 112 causes the plate 111 to assist in holding the type down upon the platform and at the same time this plate wipes the front of the nozzle plate 113.

Fig. 24 shows a modified construction of the machine shown in Figs. 1 to 8 and is regarded as important in so far as it is the preferred construction. The operation is precisely similar to that in the case of the machine illustrated in Figs. 1 to 8 but the top of the mold is formed by a block 114 located in a second block 115, the wall 116 of which forms one side of the mold, the other side being formed by the slidable member 117 mounted on a downwardly projecting portion of the member 114. A bifurcated body adjusting piece or gage member 119 is interposed between the top of the block 114 and the wall 118 of the block 115. The body adjusting piece or gage member 119 is interchangeable and in adjusting the body size of the mold the correct body piece or pieces 119 is inserted and the block 114 adjusted up to it by means of the screw 120.

Figure 2:
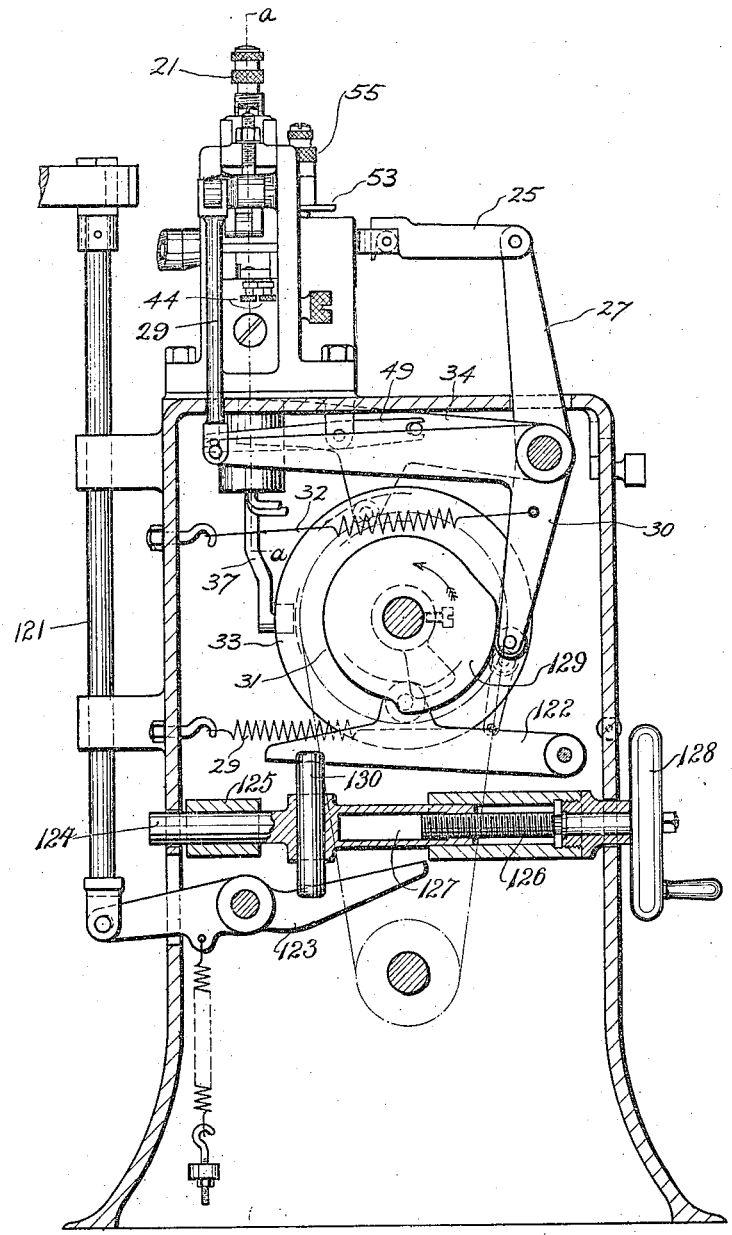
Fig. 2 is a side elevational view with the side of the pedestal removed for the sake of clearness.

In order to vary the stroke of the pump operating plunger 121 to permit of the amount of metal delivered to the mold being varied as required according as small or large types are being cast, I provide the differential levers 122 and 123 and I provide an adjusting member 124 slidable in guides 125, and this member moves by reason of the adjusting screw 126 being engaged with the internally screw threaded sleeve 127 when the operating handle 128 is turned as will be readily understood upon reference to Figs. 1 and 2 of the drawings. The pump operating plunger is actuated by reason of the cam 129 coöperating with the lever 122 and the motion of this lever is communicated to the lever 123 by the connecting buffer 130 which is vertically slidable in the horizontally slidable member 124. It will be obvious that the stroke of the pump operating plunger 121 will depend upon the position of the connecting buffer 130 between the levers 122 and 123.

What I claim and desire to secure by Letters Patent is:—

1. In a type casting machine in combination, a mold three sides of which form an inverted channel-shaped cavity, said sides being adjustable to vary the body and set width of the mold, but which are maintained in adjusted relation and of channel form throughout the casting cycle, a platform closing said mold, and means for bodily moving the mold and the platform relatively to expose the cast type.

2. In a type casting machine in combination, a mold three sides of which form an inverted channel shaped cavity, said sides being adjustable to vary the body and set width of the mold, but which are maintained in adjusted relation and of channel form throughout the casting cycle, a platform closing said mold, means for moving the mold and the platform relatively to expose the cast type, a stationary receiving platform, and means for transferring the type from the mold closing platform to said stationary platform.

3. In a type casting machine in combination, a mold three sides of which form an inverted channel shaped cavity, said sides being adjustable to vary the body and set width of the mold, but which are maintained in adjusted relation and of channel form throughout the casting cycle, a platform closing said mold during the casting operation, means for moving the platform relatively to said mold to expose the cast type, means for preventing the cast type from rising off the platform during said relative movement, a receiving platform and means for sliding the type off said movable platform onto said receiving platform.

4. In a type casting machine a mold, a platform closing said mold during the casting operation, means for relatively moving the mold and the platform to expose the cast types, means upon the surface of the platform for insuring the connection of the type to the platform by the casting operation whereby said cast types are prevented from rising off said platform but are capable of being moved sidewise, a receiving platform and means for pushing the cast types from the mold closing platform on to the receiving platform.

5. In a type casting machine a mold, a platform closing said mold during the casting operation, means for moving the platform and the mold relatively to expose the cast types, a dit casting device on the surface of said platform so formed as to prevent the cast type rising off said platform but to permit the types to be pushed off sidewise, a stationary platform for receiving the type, and means for pushing said types sidewise on to said receiving platform.

6. In a type casting machine a channel shaped mold portion, a platform relatively movable with respect to said mold portion and upon which the types are cast closing said mold, a hook like device forming a part of the tang part of the mold, said hook like device being connected to the platform and operating to hold the type down upon the platform until the type is ready for discharge.

7. In a type casting machine a mold, a platform closing said mold, means for moving the mold and the platform relatively to expose the cast type, a stationary receiving platform, means for transferring said type from the mold closing platform to the stationary receiving platform, and means for cutting nicks in the cast types as said types are packed upon the stationary receiving platform.

8. In a type casting machine a mold, a platform closing said mold, means for moving the mold and the platform relatively to expose the cast type, a stationary receiving platform, means for transferring said type from the mold closing platform to the stationary receiving platform, and means for cutting nicks in the cast types as said types are packed upon the stationary receiving platform, said means comprising pivoted cutters and means for adjusting said cutters to cut nicks of any required depth.

9. In a type casting machine a mold, a platform closing said mold during the casting operation, means for moving the platform and the mold relatively to expose the cast types, a nick casting device on the surface of said platform so formed as to prevent the cast type rising off said platform but to permit the types to be pushed off sidewise, a stationary platform for receiving the type, means for pushing said types sidewise on to said receiving platform, and means for cleaning the nick cast in said type as said type is packed on to the receiving platform.

10. In a type casting machine in combination, means forming three sides of a mold, a platform closing said mold, means for moving said means and said platform relatively to expose the cast type, and means for removing said type from said platform, one of the sides of said mold being in contact with one face of said platform during the casting operation but being slightly separated therefrom during said relative movement.

11. In a type casting machine, a channel shaped mold portion having one longitudinal side open and having parts capable of being adjusted to cast any size of type and permanently retaining its adjusted form, and a platform for closing the open longitudinal side of said mold portion at the time of casting.

12. In a type casting machine a mold, a platform closing said mold during the casting operation, means for relatively moving the mold and the platform to expose the cast types, means upon the surface of the platform for insuring the connection of the type to the platform by the casting operation, and a hook like device connected to the platform and forming part of the tang mold, whereby said cast types are prevented from rising off said platform but are capable of being moved sidewise, a receiving platform and means for pushing the cast types from the mold closing platform on to the receiving platform.

13. In a type casting machine, a channel shaped mold portion capable of being adjusted to cast any size of type and permanently retaining its adjusted form, a platform for closing the mold at the time of casting, said portion comprising an interchangeable body forming piece corresponding in thickness with the required body size of the type and forming one side of the mold, and a frame capable of adjusting said body forming piece to cast type of the required set width and holding the same permanently in such adjusted position.

14. In a type casting machine, a channel shaped mold portion having parts capable of being adjusted to cast type of any body and set width and permanently retaining its adjusted form, a platform for closing the mold at the time of casting, a matrix holder comprising means for holding either a matrix with side spaces or one or more matrices each corresponding in its thickness to that of the face on its edge, and means for reciprocating the matrix holder.

15. In a type casting machine, a channel shaped mold portion having parts capable of being adjusted to cast type of any body and set width and permanently retaining its adjusted form, a platform for closing the mold at the time of casting, a matrix holder comprising means for holding either a matrix with side spaces or one or more matrices each corresponding in its thickness to that of the face on its edge, said means consisting of detachable side plates corresponding in thickness to that of the side spaces on a matrix and removable when such a matrix is used but retained on each side of a matrix that corresponds in its thickness to that of its face on its edge, means for holding in alinement and adjusting vertically such matrix or matrices, and means for reciprocating the matrix holder.

16. In a type casting machine, a channel shaped mold portion having its parts capable of being adjusted to cast type of any body or set width and permanently retaining its adjusted form, a platform for closing the mold at the time of casting and for carrying the cast type to the discharging position, a matrix holder comprising means for holding either a matrix with side spaces or one or more matrices each corresponding in its thickness to that of its face on its edge, a pusher plate for pushing the type from the platform, a stationary receiving platform for receiving the type from said first mentioned platform, said mold portion comprising a body forming piece, a frame for holding said body forming piece and capable of adjusting said body forming piece to vary the set width of the mold, said frame having an abutment fixed to the side thereof and coming in contact with the side of the matrix or matrices or side plate held in the matrix holder whereby the position of the frame and body piece and the corresponding set width of the mold is adjusted to correspond with the members held in the matrix holder, and means for moving said matrix holder.

17. In a type casting machine in combination, a channel shaped mold portion capable of being adjusted to vary the body and set width of the type to be cast and permanently retaining an open channel formed throughout the casting cycle, means for closing the mold while the type is being cast and means for producing relative motion between said portion and said first mentioned means to expose the cast type.

In testimony whereof I affix my signature in presence of two witnesses.

SHANKER ABAJI BHISEY.

Witnesses:
O. J. WORTH,
R. MILHEMEL.

Copies of this patent may be obtained for five cents each, by addressing the "Commissioner of Patents. Washington, D. C."